(12) United States Patent
Zalevsky et al.

(10) Patent No.: US 6,807,329 B2
(45) Date of Patent: Oct. 19, 2004

(54) METHOD AND DEVICE FOR POLARIZATION-BASED ALL-OPTICAL SWITCHING

(75) Inventors: Zeev Zalevsky, Rosh HaAyin (IL); Naim Konforti, Holon (IL); Efraim Goldenberg, Ashdod (IL); Gal Shabtay, Petach Tikva (IL); Yehuda Miron, Tel Aviv (IL)

(73) Assignee: CIVCOM Devices & Systems Ltd., Petach-Tikva (IL)

( * ) Notice: Subject to any disclaimer, the term of this patent is extended or adjusted under 35 U.S.C. 154(b) by 0 days.

(21) Appl. No.: 09/907,252

(22) Filed: Jul. 17, 2001

(65) Prior Publication Data

US 2003/0021519 A1 Jan. 30, 2003

(51) Int. Cl.[7] .............................. G02B 6/26; G02B 6/42
(52) U.S. Cl. ........................ 385/16; 385/18; 385/20; 385/22
(58) Field of Search ................ 385/16–24, 11; 398/65; 359/117, 122, 256, 258, 301, 302, 303, 245, 248, 247, 251, 494–499

(56) References Cited

U.S. PATENT DOCUMENTS

| | | | |
|---|---|---|---|
| 5,363,228 A | 11/1994 | DeJule et al. | 359/117 |
| 5,414,541 A | 5/1995 | Patel et al. | 359/39 |
| 5,694,233 A | 12/1997 | Wu et al. | 359/117 |
| 5,724,165 A * | 3/1998 | Wu | 359/117 |
| 5,960,133 A | 9/1999 | Tomlinson | 385/18 |
| 5,987,040 A | 11/1999 | Nesset et al. | 372/8 |
| 6,041,151 A | 3/2000 | Mendlovic | 385/16 |
| 6,049,404 A * | 4/2000 | Wu et al. | 359/117 |
| 6,097,518 A | 8/2000 | Wu et al. | 359/128 |
| 6,137,619 A * | 10/2000 | Chen et al. | 359/251 |
| 6,160,665 A * | 12/2000 | Yuan | 359/629 |
| 6,166,838 A | 12/2000 | Liu et al. | 359/128 |
| 6,275,312 B1 * | 8/2001 | Derks et al. | 359/117 |
| 6,331,910 B1 * | 12/2001 | Dultz et al. | 359/246 |
| 6,360,034 B1 * | 3/2002 | Chang | 385/18 |
| 6,360,037 B1 * | 3/2002 | Riza | 385/22 |
| 6,470,132 B1 | 10/2002 | Nousiainen et al. | 385/146 |

FOREIGN PATENT DOCUMENTS

| | | | |
|---|---|---|---|
| GB | 2 191 302 | 12/1987 | G02F/3/00 |
| WO | WO 97/09536 | 3/1997 | |

OTHER PUBLICATIONS

Urushidani, S. et al.; "A High–Performance Switch Architecture for Free–Space Photonic Switching Systems;" IEICE Transactions on Communications;vol. E82–B; No. 2; Feb. 1999; pp. 298–305; XP000940180.

Masashi, H. et al.; "Programmable Optical Parallel Processor Based Upon Polarization Modulation: Cascade Operations;" Applied Optics; vol. 28; No. 20; Oct. 15, 1989; pp. 4305–4312;XP000071267.

Wu, C.S. et al.; "Liquid–Crystal–Based Switchable Polarizers for Senor Protection;"Nov. 1, 1995; Applied Optics; vol. 34; No. 31; pp. 7221–7227.

\* cited by examiner

Primary Examiner—Akm Enayet Ullah
Assistant Examiner—Kevin S. Wood
(74) Attorney, Agent, or Firm—Fenster & Company

(57) ABSTRACT

This application describes an optical switching method for selectively directing an input beam to at least one of two output channels. The input beam impinges on a polarizing beam splitting surface, splitting the input beam into two beam components of different polarizations propagating along different optical paths. These beam components then pass through a controllable polarization rotating medium which selectively affects the polarization of each of the beam components. The beam components are then directed back onto the polarizing beam splitting surface again, producing at least one output beam which propagates toward at least one selected output channel, depending on the state of the medium. The polarizing beam splitting surface is fabricated on a block of the controllable polarization rotating medium, and the input beam also passes through the medium before being split into two beam components by the polarizing beam splitting surface.

54 Claims, 7 Drawing Sheets

METHOD AND DEVICE FOR POLARIZATION-BASED ALL-OPTICAL SWITCHING

FIELD OF THE INVENTION

This invention is generally in the field of switching techniques and relates to a method and device for all-optical switching.

BACKGROUND OF THE INVENTION

Optical communication networks require cross-connect or switching mechanisms enabling direction, diversion, multiplexing or broadcasting (multicasting) of a plurality of information channels in a manner to meet the requirements of the network. Optical switches can also be used in Dense Wavelength Division Multiplexing (DWDM) telecommunication systems for routing the information, enabling optical add/drop multiplexing (OADM), as well as for protection purposes.

Switching modules have various forms, such as structures whereby N input channels are directed simultaneously to M output ports in various configurations. In a dynamic switch, this operation can be reshuffled in time.

The so-called "all-optical switches" are capable of performing the switching function without converting the signals from the optical domain to the electrical domain and back. Such an optical switch is disclosed, for example, in U.S. Pat. No. 6,041,151. This switch device utilizes a double refracting crystal operating as a polarizing beam displacer in conjunction with a controllable half wave gate that is able to rotate the polarization of an incident light beam by 90 degrees in accordance with a control input.

SUMMARY OF THE INVENTION

There is accordingly a need in the art to facilitate a switching technique by providing a novel all-optical switch device of a simple and compact design.

An all-optical switch device according to the invention does not depend on optics-electronics-optics (O-E-O) conversion, and does not need movement of the elements of the switch device. The switch device is characterized by fast operation exhibiting low insertion loss and minimal cross talk between output channels. The switch device is based on the electro-optic effect exhibited in a material of the kind capable of dynamically producing a phase delay for each polarization component of an incident light beam as a function of a voltage applied to the material. Such a material may be Lead Lanthanum Zirconate Titanate (PLZT), BSO or $LiNbO_3$. The varying phase delay may result in a controllable polarization rotation.

The main idea of the present invention consists of designing a switch device having a polarizing beam splitting surface, controllable polarization rotating (CPR) means, and beam directing means. The CPR and/or beam directing means may be separate elements accommodated at opposite sides of the polarizing beam splitting surface. The polarizing beam splitting surface may be the surface of a beam splitter (e.g. cubic beam splitter). The CPR and beam directing means may be integral with the beam splitter, by making the entire beam splitter or respective portions thereof from a polarization rotating material and making respective surfaces of the beam splitter reflective. Alternatively, the CPR and beam directing means may be separate elements accommodated at respective surfaces of the beam splitter.

An input beam (either unpolarized or of a specific polarization) impinges onto the polarizing splitting surface, and can be split into two linearly polarized beam components (in the case of unpolarized input beam), which propagate along different optical paths. The beam components of the input beam interact with the CPR means and beam directing means, and return back to the polarizing beam splitting surface, where at least one output beam (e.g., of no particular polarization state, namely, consisting of different polarization components) is produced. It should be understood that, when a polarized input beam is used, the device of the present invention provides for directing this beam to a selected one of two output channels.

If the entire beam splitter is made of a polarization rotating material, then, in the operative state of the beam splitter, the different polarization components of an input beam undergo polarization rotation prior to being split by the polarizing beam splitting surface of the beam splitter. Depending on the current mode of the CPR means (which may and may not be integral with the beam splitter), namely, operative or inoperative modes of the CPR, the output beam can be directed towards one of the two output channels of the device, or two output beam components can be directed towards both output channels, respectively. The CPR in the inoperative and operative modes thereof does not affect and does affect, respectively, the polarization of the beam passing therethrough.

The controllable portion rotating medium is shiftable between its inactivated and activated states by application of an electric field to the medium. Depending on the type of the medium being used, one of its states presents an operative mode of the medium, and the other state presents an inoperative mode of the medium. Polarization rotating medium of the kind based on the electro-optic effect (e.g., ferroelectric crystals or ceramics) is in the operative mode (affecting the polarization of a beam), when in the activated state of the medium. The polarization rotating medium of the kind utilizing LC materials is in its inoperative mode (i.e., does not affect the polarization state of a beam), when in the activated state of the medium, and is in its operative mode (i.e., affects the polarization state of a beam), when in the inactivated state of the medium.

Hence, the terms "inoperative mode" and "operative mode" of a CPR medium are associated with effect of the medium with respect to an incident beam, irrespective of the terms "activated" and "inactivated" states which are associated with the application of an electric field to the CPR. In the inoperative mode of the CPR, it does not affect the polarization of the beam, and in the operative state of the CPR, it affects the polarization of the beam.

Thus, according to one aspect of the present invention, there is provided a switching method for selectively directing an input beam to at least one of two output channels, the method comprising the steps of:

(i) providing incidence of the input beam onto a polarizing beam splitting surface to thereby enable splitting of the input beam into two beam components of different polarizations propagating along different optical paths;

(ii) passing the input beam components of different polarizations through a controllable polarization rotating medium capable of affecting the polarization of each of the beam components; and (iii) directing the beam components that have passed through said medium onto said polarizing surface, thereby producing at least one output beam propagating towards at least one selected output channel, depending on a current mode of the polarization rotating medium.

It should be understood that the input beam may be unpolarized, namely a randomly polarized beam (of no specific polarization state), containing beam components of different polarizations. Alternatively, the input beam may have a specific polarization. In this case, the interaction of the input beam with the polarizing beam splitting surface will result in the beam propagation along a specific optical path.

It should also be understood that the input beam may pass the CPR medium prior to being split into the two beam components of different polarizations. This may be implemented by utilizing a beam splitter having the polarizing beam splitting surface and being made from a controllable polarization rotating material.

According to another aspect of the present invention, there is provided an all-optical switch device operable for selectively directing an input beam to at least one of two output channels, the device comprising:

(a) a polarizing beam splitting surface capable of splitting an input beam into two beam components of different polarizations and directing the split beam components to propagate along different optical paths, and capable of combining two beam components of different polarizations to produce at least one output beam;

(b) controllable polarization rotating means accommodated in optical paths of the input beam components, and selectively operable to affect the polarization thereof; and (c) beam directing means accommodated in optical path of the beam components passed through the polarization rotating means for directing the beam components onto said polarizing beam splitting surface to thereby produce at least one output beam propagating towards at least one selected output channel.

Preferably, the polling beam splitting surface is a surface of a cubic beam splitter. The polarization rotating means may be in the form of two elements accommodated at opposite sides of the polarizing beam splitting surface.

For example, the polarization rotating means may be accommodated at surfaces of the beam splitter that intercept with the plane of the polarizing surface. In this case, the beam directing means may be in the form of two pairs of reflecting surfaces, each pair located at opposite sides of the corresponding one of the polarization rotating elements.

The two polarization rotating elements may be incorporated in two corner prisms, respectively, located at the adjacent surfaces of the beam splitter that intercept with the plane of the polarizing surface. Two corner prisms accommodated at said adjacent surfaces of the beam splitter and made from a polarization rotating material may be used, thereby function as both the polarization rotating and the beam directing means.

The polarizing beam splitter may be configured such that its two adjacent surfaces that intercept with the plane of the polarizing beam splitting surface are shaped like two-part right-angle prisms. In this case, the polarization rotating means are two elements, each located inside a groove-like space of the respective prism, and the beam directing means are represented by reflective surfaces of the beam splitter (the surfaces of the prisms). Alternatively, such a beam splitter may be made from a polarization rotating material, the polarization rotating means being thereby presented at two parts of the beam splitter at opposite sides, respectively, of the polarizing surface.

The beam splitter in another configuration may have three locally adjacent truncated corners forming three facets, the intermediate facet being that intercepting with the plane of the polarizing facet. In this case, the polarization rotating means are in the form of two plates located on the other two facets, respectively, and the beam directing means are represented by the rear reflective surfaces of the polarization rotating plates and by the intermediate facet of the beam splitter. Alternatively, in such a beam splitter with three facets, the polarization rotating means may be in the form of only one plate located on the intermediate facet, the rear reflective surface of this plate, and the reflective inner surfaces of other two facets serving as the beam directing means.

According to yet another aspect of the present invention, there is provided an all-optical switch device in the form of a polarizing beam splitter made of a polarization rotating material.

The all-optical switch device according to the invention may be used as a basic block in a multi-stage switch structure. In tis case, a required number of such basic devices are arranged in an array, and additional beam direct means are used for directing an output beam of one device to input a successive device.

Thus, according to yet another aspect of the present invention, there is provided a multi-stage all-optical switch structure comprising an array of at least first and second switch devices, each constructed as described above; and at least one beam directing element accommodated in an optical path of the output beam produced by the first switch device to direct said output beam onto a polarizing beam splitting surface of the second switch device.

The multi-stage switch structure composed of three switch devices, each constructed as described above, may be used for reducing crosstalk between output channels and/or for increasing the switch speed. In this case, the switch devices are arranged such that two output channels of the first device serves as two input channels of, respectively, the second and the third devices. One of the output channels of the second switch device and one of the output channels of the third switch device are blocked to prevent light output therethrough. By this, light signals collected at unblocked output channels of the second and third switch devices are characterized by reduced crosstalk. By increasing the number of switching stages in the switching structure, the crosstalk between output channels can be even more reduced. To increase a switching speed with the same switching structure composed of three switch devices, the polarization rotating means is operated to provide rotation of the polarization of the incident beam at an angle other than 90°.

The switch device according to the invention, can be used for multicast switching (generally, variable beam splitting). This is implemented by utilizing a CPR of the kind, where any desired difference in phase delay (from 0 to $\lambda/2$) can be created between the two principle axes of the CPR material. This enables to obtain any desired partition between the output beam polarization components it the CPR output, and, consequently, any partition between the output channels of the switching device.

The above concept can be utilized for using the device according to the invention as a variable attenuator. This is implemented by blocking one of the output channels of the switch device, and, optionally, further combining several switch devices in series.

The present invention also provides for correcting errors that can be introduced by the splitting on the unpolarized input beam at the polarizing beam splitting surface. This is implemented by including an additional polarizing beam splitter cube in the beam directing means, and, optionally, also a polarization rotator (e.g., λ/2 plate) in front of the additional polarizing beam splitter cube.

The present invention also provides for compensating the hysteresis phenomenon that can be observed with a CPR. This is implemented by appropriately controlling voltages applied to the CPR.

Additionally, the present invention provides for reducing switching differential voltage requirements. This is implemented by applying appropriate voltages to the CPR (depending on the CPR type) to cause phase delays of λ/2 and λ between the split beam components, rather than the phase delays of 0 and λ/2.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1A:
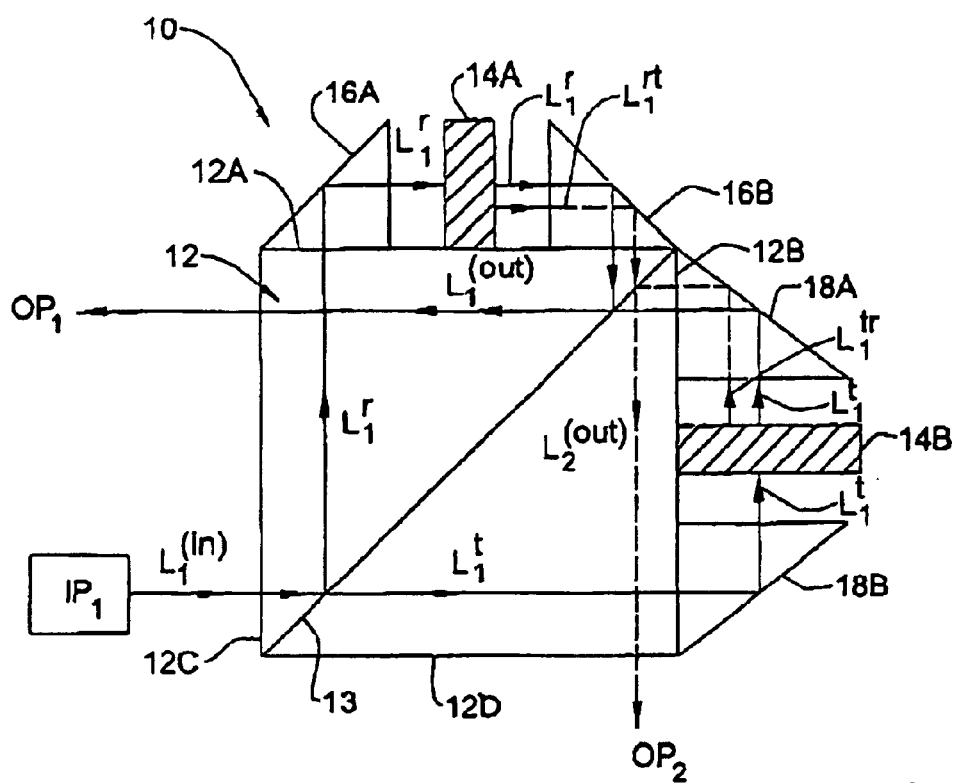
FIGS. 1A and 1B schematically illustrate a basic block of an all-optical switch device according to one example of the invention.

An all-optical switch of the present invention utilizes such main functional parts as a polarizing beam splitter, controllable polarization rotating (CPR) means, and a beam-directing means, e.g., retro-reflective means. The CPR may be any medium that dynamically affects the polarization of incident light either in response to the application of an electric field ("activated state") or not ("inactivated state"). An electric field is referred to hereinbelow as an electrostatic field.

CPRs suitable to be used in the present invention may be of two common types. CPRs of the first type utilize such materials as ferroelectric crystals, e.g., lithium niobate (LiNbO$_3$), which are usually based on the linear electro-optic effect, or ceramics, e.g., Lead Lanthanum Zirconate Titanate (PLZT), which are based on the quadratic electro-optic effect, also known as Kerr effect. The electro-optic effect consists of the following: If a transverse field is applied to such a CPR material, the material becomes birefringent (i.e., the refractive index along the electrostatic field direction is different from the refractive index along the orthogonal direction). This causes a phase delay between the two optical field's components, and 90-degrees polarization rotation can be achieved, provided that the optical field of incident light is linearly polarized and oriented at 45 degrees relative to the applied electrostatic field.

CPRs of the second type utilize liquid crystal (LC) materials. Here, the effect of polarization rotation is associated with the fact that LC molecules have an un-isotropic shape, and therefore act as a birefringent material (i.e., different index of refraction for the two transversal (orthogonal) axes). With such a CPR, an electrostatic field parallel (longitudinal field) to the direction of beam propagation is applied. If nematic LC is used, in order to achieve 90-degree polarization rotation, the polarization of an incident light should be linear and oriented at 45 degree with respect to the Nematic LC principal axes. In addition, the phase retardation (delay) should be λ/2. if twisted nematic LC is used, no 45degree incident angle is needed, since the polarization tracks the twist of the molecules (step-wise). The application of an electro-static field to the CPR of the second type cancels the birefringent effect thereof.

It should be noted that for any type of CPR, whenever a phase retardation (delay) other than λ/2 is considered, an elliptical polarization is obtained. When using a ferroelectric LC, the polarization states of the output beam can be only one out of two possible states (a so-called "binary CPR"). The CPR of the first type is in the operative mode (i.e., affects the polarization of an incident beam), when in the activated state of the medium, and is in the inoperative mode thereof (does not affect the polarization state of a beam), when in the inactivated state of the medium. CPR of the second type is in its inoperative and operative modes, when in the activated and inactivated states, respectively, of the medium.

Thus, the application of an electrostatic field (voltage) to a CPR of the first type (i.e., shifting the CPR into its activated state) affects the polarization state of incident light. It is common to use a zero electrostatic field when the polarization state should not be affected, and to use a non-zero electrostatic field for the opposite situation. However, instead of using a zero electrostatic field, a non-zero field can be used as well for the same purpose (not affecting the polarization state). Hence, any such pair of operative and non-operative modes of the CPR can be selected, provided that a difference of λ/2 exists between the two modes.

When using the CPR of the first type, it may be advantageous to operate the CPR in such electrostatic fields that cause phase delays of λ/2 and λ instead of 0 phase delay and λ/2, and by this reduce switching differential voltage requirements.

It should be noted that, although in all the embodiments of the invention described below the use of a CPR of the first type is exemplified, a CPR of the other type can be used as well, keeping in mind that operative and non-operative modes of the CPR of the second type are provided when in the inactivated and activated states, respectively, of the CPR medium.

It should be understood that for the purposes of the present invention (i.e., switching), an input beam can be any light beam, visible or invisible, having any frequency, and being either of non-specific polarization (unpolarized beam) or polarized. To simplify the description of the invention, the input beam is referred to hereinbelow as an unpolarized beam. For splitting an unpolarized beam into two linearly polarized beam components, various optical means having a polarizing beam splitting interface can be used, such as a beam splitter (thin films coating), natural crystals (e.g., calcites), synthetic crystals (e.g., YVO$_4$). These elements split an unpolarized beam into two linearly polarized components, or combine such linearly polarized components into an unpolarized beam or two polarized beams, depending on the polarizations of the beam components impinging onto the polarizing beam splitting surface.

Figure 1B:
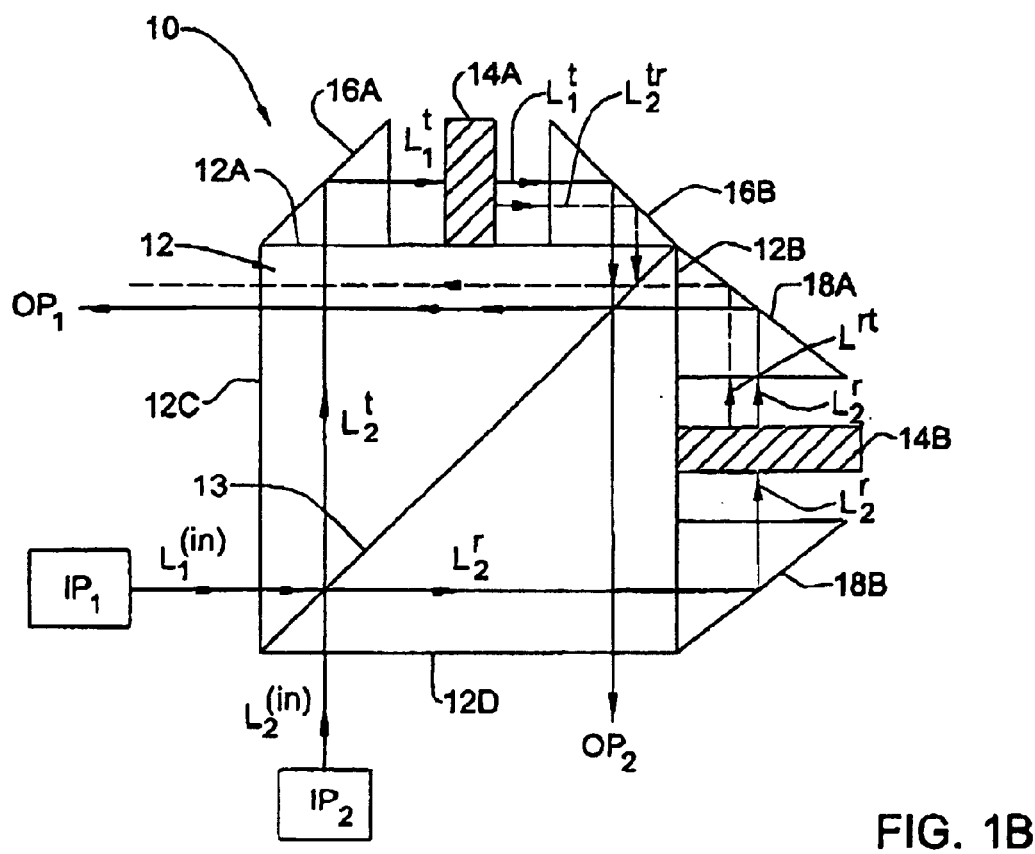

Referring to FIGS. 1A–1B, there is illustrated an all-optical switch device 10 according to one example of the invention. The device 10 comprises a polarizing beam splitter cube 12, that has a polarizing beam splitting surface along its diagonal 13; CPR elements 14A and 14B; and beam directing elements 16A–16B and 18A–18B. In the present example, the beam directing elements are two-part retro-reflective elements, wherein each part of each of the retro-reflective element is a mirror, e.g., right-angle prism with reflective coating on its hypotenuse. The CPR elements 14A and 14B, and the elements 16A–16B and 18A–18B are placed on the adjacent surfaces 12A and 12B of the beam splitter cube 12, such that the CPR element 14A is located between the parts 16A and 16B of one retro-reflective element, and the CPR 14B is located between the parts 18A and 18B of the other retro-reflective element.

It should be understood that the use of the polarizing beam splitter cube 12 is a non-limiting example of the invention, and any other configuration of the polarizing beam splitting surface appropriately oriented with respect to other electro-optical elements can be used for the purposes of the present invention. For example, a wedge with proper coating on one of its surfaces can be used.

The switch device 10 of the present invention can operate as a 1×2, 2×2, or 2×1 switch device. The operation of the 1×2 switch utilizing an unpolarized input beam will now be described with reference to FIG. 1A. An unpolarized beam $L_1^{(m)}$ supplied from an input port $IP_1$ passes through the device 10 and ensues therefrom either through an output channel $OP_1$ or an output channel $OP_2$. The beam $L_1^{(m)}$ impinges onto a surface 12C of the poling beam splitter 12 and propagates towards its polarizing beam splitting surface 13, where the beam $L_1^{(m)}$ is split into two linearly polarized components $L_1^t$ and $L_1^r$, which are respectively, transmitted and reflected light components. The linearly polarized components $L_1^t$ and $L_1^r$ propagate towards the retro-reflective elements located on the beam splitter surfaces 12B and 12A, respectively. The beam component $L_1^t$ is reflected from one part 18B of the retro-reflective element and propagates towards the other part 18A thereof through the CPR 14B. The beam $L_1^r$ is reflected from one part 16A of the retro-reflective element and propagates towards the other part 16B thereof through the CPR 14A.

It should be noted, although not specifically shown, that in order to eliminate or at least significantly reduce back-reflections from an optical element accommodated in the optical path of a beam (e.g., CPR) towards the input port(s), the beam should impinge onto the respective surface of the optical element (e.g., the beam component $L_1^t$ onto the CPR 14B) with an appropriate angle of incidence. This is relevant for all the examples of the present invention described herein.

When considering CPR of the first type, in order to obtain a 90-degrees polarization rotation of an incident linearly polarized beam, the polarization of the beam should be oriented at 45 degrees relative to the electrical field applied to the CPR medium. These can be achieved either by adequately orienting the polarization direction of the incident beam, or by adequately orienting the CPR itself.

It should also be noted that the reflections inside the switch device (either total internal reflection (TIR) or not) may result in phase changes between the incident and reflected beams. Such changes may cause the phase shift between the transmitted and reflected beam components (former p- and s-polarization components), and will act as noise in the system or as unwanted signals in the output channels. These effects can be compensated by the appropriately applied voltage over the CPR, so as to appropriately increase or decrease the phases (i.e., fit the phases) of the beams passing through the CPR. The appropriate application of voltages to the CPR can also be used for compensating for the hysteresis phenomenon (that can be observed with a CPR.

Turning back to FIGS. 1A and 1B, it should be understood that, during the operation of the switch device, the CPR elements 14A and 14B are either both in the inactivated state, or both in the activated state. Considering the CPR elements based on the Kerr effect, if the CPR elements are inactivated, the beams $L_1^t$ and $L_1^r$ impinge onto the retro-reflective parts 18A and 16B without being affected by the CPR elements 14A and 14B, and are reflected back into the beam splitter. Here, the beams $L_1^t$ and $L_1^r$ impinge onto the surface 13 to, respectively, pass through and be reflected from the surface 13. The beams $L_1^t$ and $L_1^r$ are thus combined into an unpolarized output beam $L^{(out)}_1$, which ensues from the beam splitter through the same input surface 12C to propagate though the output channel $OP_1$. This presents the switch commutation on one of the two-output channels.

If the CPR elements 14A and 14B (which are CPRs of the first type) are in their activated states (operative mode), they change the polarization states of beam components $L_1^r$ and $L_1^t$, respectively, into the opposite ones, $L''^r_1$ and $L''^t_1$ (shown in dashed lines). The beams $L''^r_1$ and $L''^t_1$ are reflected by the retro-reflective parts 16B and 18A, respectively, and impinge onto the surface 13. Here, due to the opposite polarizations of the beams, as compared to their original state created by the first interaction with the polarizing surface, the beam $L''^r_1$ is transmitted through the surface 13, while the beam $L''^t_1$ is reflected by the surface 13, thereby resulting in a combined unpolarized output beam $L^{(out)}_2$, which ensues from the beam splitter through the surface 12D to propagate towards the output channel $OP_2$.

Figure 1C:
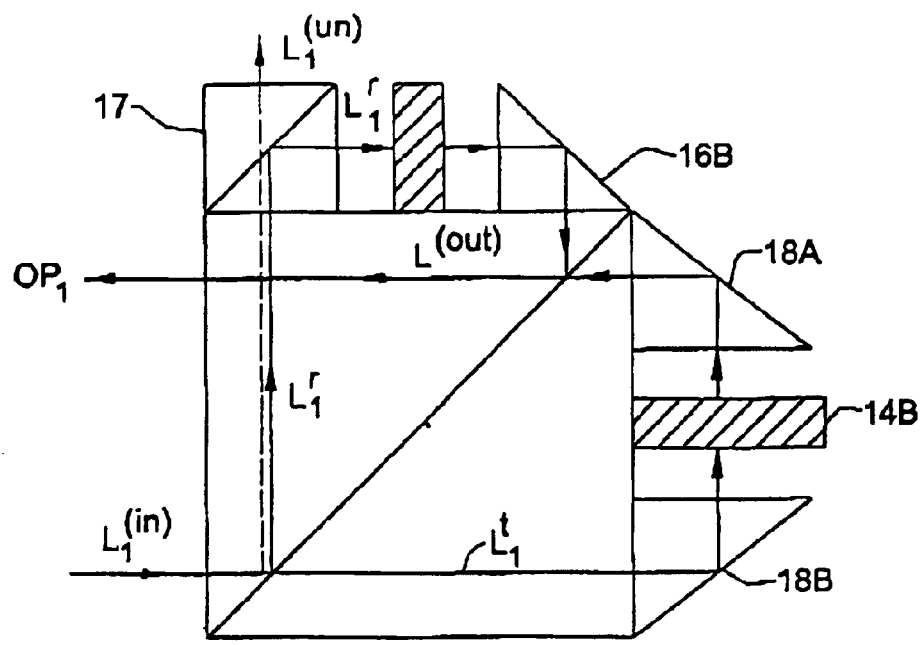
FIGS. 1C and 1D illustrate two examples of a basic block of an all-optical switch device according to the invention utilizing filter means for correcting errors of two different kinds, respectively, that may be introduced by the interaction of an unpolarized input beam with a polarizing beam splitting interface.

It should be noted, although not specifically shown, that the case may be such that the splitting of the unpolarized input beam at the interface 13 may introduce errors that can generally be of two types associated with the following:

(i) A small part (e.g., 2%) of the input beam component to be transmitted by the polarizing beam splitting spice 13 is reflected therefrom, and this "unwanted" light component joins the other (reflected) beam component $L^r_1$. This 2%-reflected light component will propagate through the output channel $OP_2$ (assuming the CPR does not change the polarization state of the beam, i.e., is in its inoperative mode), thereby introducing an unwanted output signal. As shown in FIG. 1C, in order to correct such an error, the reflective surface of the corner-prism part (e.g., 16A) could be replaced by a filtering means in the form of a polarizing beam splitter cube 17 that transmits the unwanted component $L_1^{(on)}$ out of the switch device.

Figure 1D:
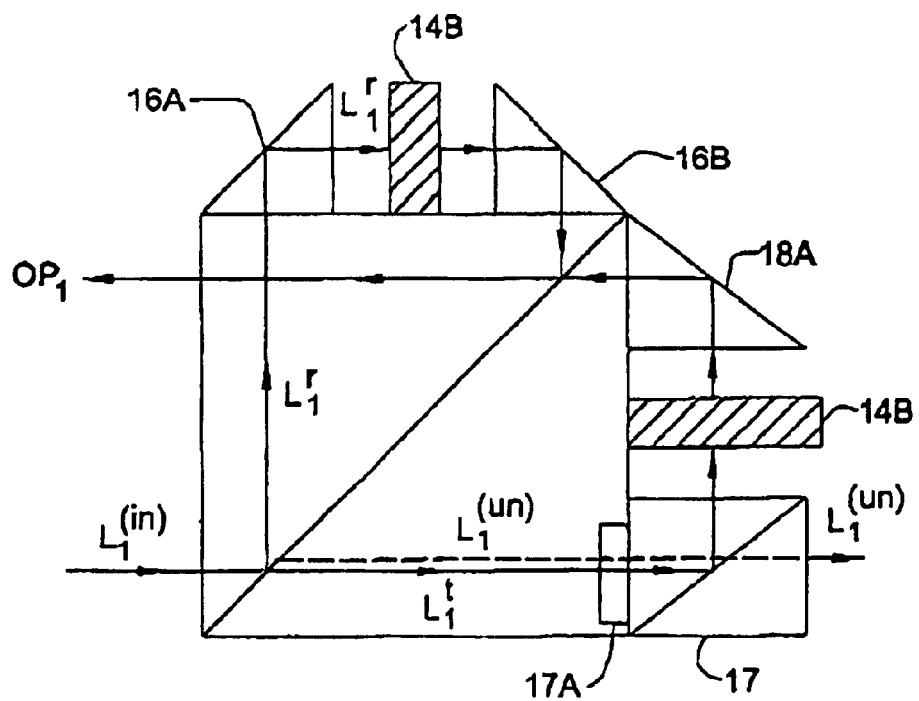

(ii) A small part of the beam component to be reflected from the surface 13 of the beam splitter is transmitted therethrough, and this unwanted beam component $L_1^{(un)}$ joins the transmitted beam component $L^t_1$. As shown in FIG. 1D, to correct for this error, the corner prism part 18B can be replaced by a filtering means, including a polarization rotator 17A (e.g., λ/2 plate) followed by a polarizing beams splitter cube 17. In addition, the operation of the CPR 14B should be adapted to change the polarization state accordingly.

With regard to a non-binary CPR, the following should be noted: Since any difference in phase delay (from 0 to $\lambda/2$) can be created between the two principle axes of a CPR material, any partition between the beam polarization components in the CPR output can be achieved. When the input beam component $L_1^r$ (reflected by the surface 13) enters the CPR 14A, the case may be such that the passage of this beam component through the CPR results in a new polarization state (elliptical) different from that of the incident beam component $L_1^r$. Consequently, the beam component with the new polarization state, after being reflected by the corner prism 16B to the surface 13, will then be split by the surface 13 into two components: one reflected from the surface 13 and propagating towards the output channel $OP_1$, and the other transmitted through the surface 13 and propagating towards the output $OP_2$. The similar situation takes place with respect to the input beam component $L_1^t$ (transmitted through the surface 13).

Hence, by the above operation of the switch device, each of the input beam components $L_1^r$ and $L_1^t$ is divided between the two output channels $OP_1$ and $OP_2$ by controllable divisions, and, consequently, any partition of the input energy between the output channels of the switching device can be achieved. This provides for using the switch device of the present invention as a variable beam splitter, e.g., multicast. If one of the outputs is blocked, the device can be used as a variable attenuator. Such an attenuator can be improved by combining several switch devices in series.

As shown in FIG. 1B, to operate the device 10 in a 2×2 switching configuration, two input beams $L^{(in)}_1$ and $L^{(in)}_2$ are supplied through input ports $IP_1$ and $IP_2$ so as to impinge onto the surfaces 12C and 12D, respectively, of the beam splitter 12. The propagation of the beam $L^{(in)}_1$ is similar to the above-described example of FIG. 1A, and is therefore not shown here. This beam can be supplied to either one of the output channels $OP_1$ or $OP_2$, depending on, respectively, the inactivated or activated states of the CPR elements 14A and 14B. The beam $L^{(in)}_2$ impinges onto the diagonal surface 13, and is split into two different linearly polarized beam components $L_2^r$ and $L_2^t$, and, is directed to that output channel where the beam $L^{(in)}_1$ does not arrive.

It should be understood that in order to operate the device 10 as a 2×1 switch, a respective one of the output ports is blocked (presenting the so-called "dead end"), for example, by using an absorptive element. It should be noted that all such switching functions as 1×2, 2×2, 2×1 can be implemented with either one of the exemplified configurations (FIGS. 1–8), and therefore will not be described in details.

Figure 2:
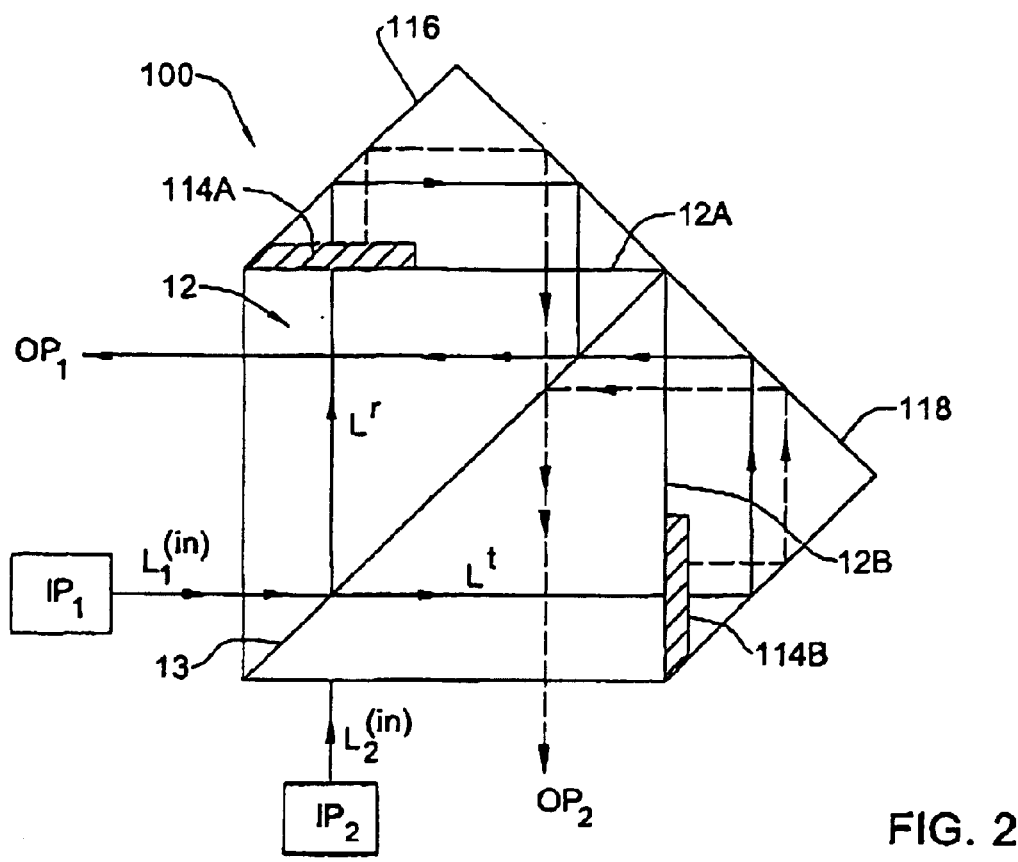
FIGS. 2 to 8 illustrate more embodiments of the basic block of the all-optical switch, differing from each other and from that of FIGS. 1A–1B in the accommodation and/or configuration of a polarization rotating element.

Reference is made to FIG. 2 illustrating an all-optical switch device 100 according to another example of the invention. Here, in distinction to the example of FIGS. 1A–1B, the single-part retro-reflective elements 116 and 118 in the form of corner prisms accommodated at the surfaces 12A and 12B, respectively, of the beam splitter 12 are used, instead of two-part right-angle prisms. In this case, CPR elements 114A and 114B are incorporated in the elements 116 and 118, respectively. The beam propagation is generally similar to the above described example, and therefore need not be described in detail, except to note the following. In this configuration, the polarization state of the beam component is affectable by the CPR, when in the activated state thereof, prior to the beam reflection within the corner prism.

Figure 3A:
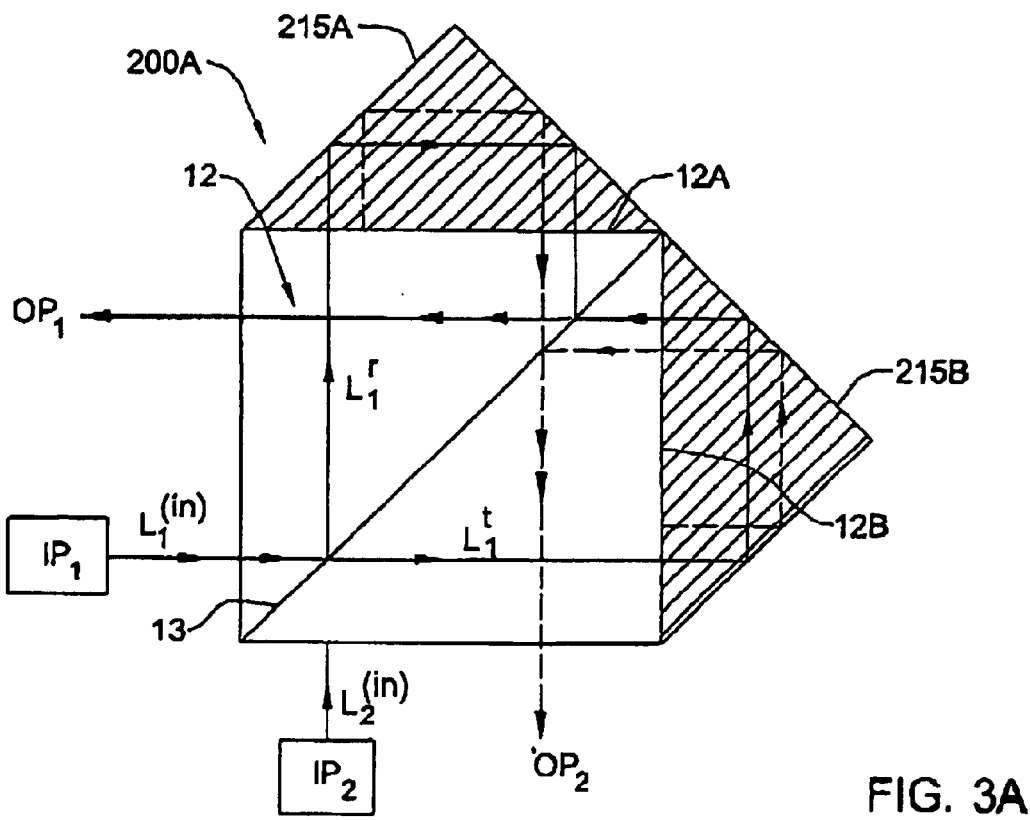
Figure 3B:
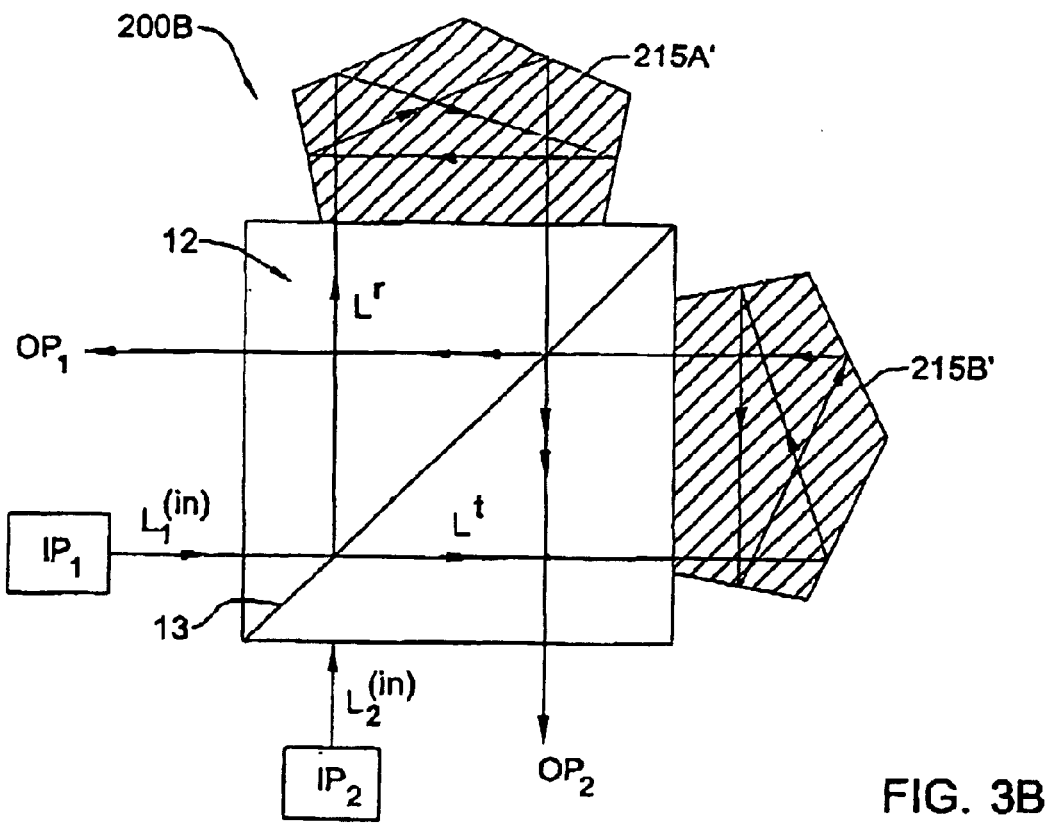
Figure 4:
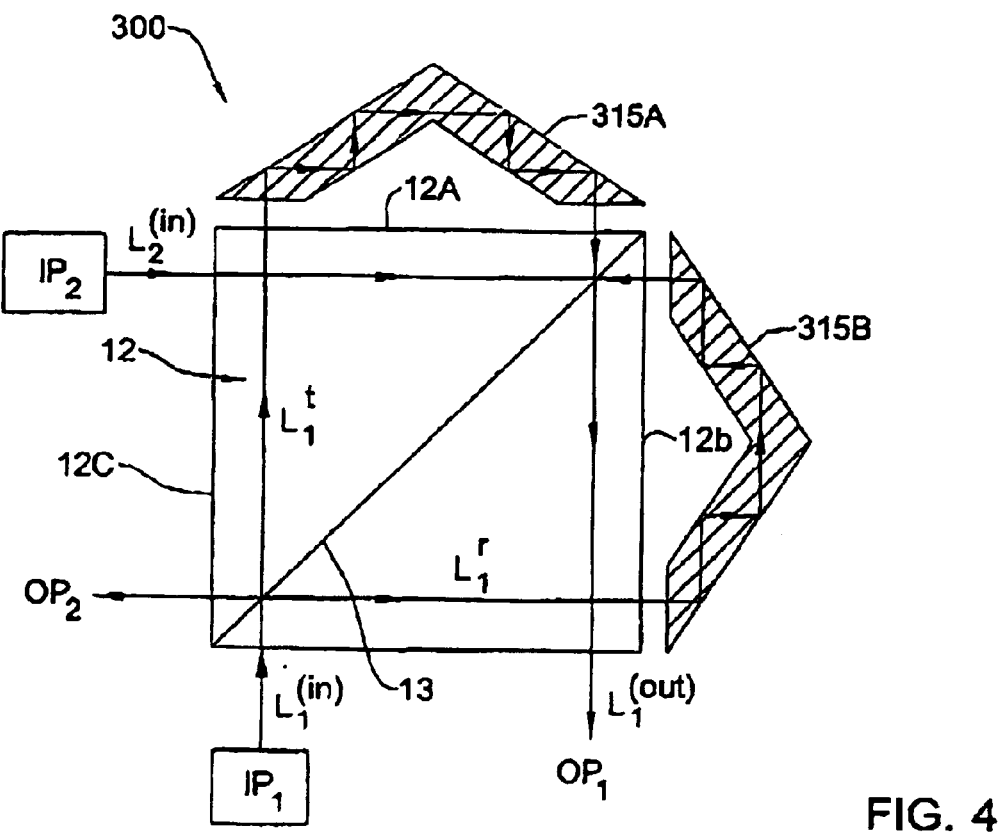

FIGS. 3A, 3B and 4 illustrate all-optical switch devices according to the invention, where the beam directing means are incorporated in the polarization rotating means, namely, the polarization rotating and beam directing functions are performed by the same element, functioning both as a retro-reflective element and a CPR.

FIG. 3A illustrates an all-optical switch 200A, in which two such polarization rotating and beam directing elements 215A and 215B are accommodated on the surfaces 12A and 12B, respectively, of the beam splitter cube 12. In the present example, the elements 215A and 215B are in the form of corner prisms made of a polarization rotating material. It should be understood that this configuration might provide for a longer optical path of beams within the elements 215A and 215B. By this, the operational electrostatic field required to activate the CPR media can be reduced, as compared to the previously described examples.

It should be noted, although not specifically shown in the figure, that two pairs of $\lambda/2$-plates may be used, the $\lambda/2$-plates of each pair being accommodated in the optical path of the beam propagating towards and ensuing from the CPR, respectively. The $\lambda/2$-plate located in front of the CPR element (with respect to the direction of beam propagation) is needed to orient the polarization direction of the incident beam at 45 degrees with respect to the electrostatic field applied to the CPR medium, and the rear $\lambda/2$ plate serves to re-orient the polarization direction of the CPR output by 45-degree rotation.

FIG. 3B illustrates an optical switch device 200B designed so as to substantially decrease the area of CPR elements 215A' and 215B', as compared to the example of FIG. 3A, and subsequently, reduce the area occupied by the polarizing beam splitter cube 12. The CPR element presents a penta-like structure. As shown, a beam impinging onto the CPR element undergoes four reflections. This might provide an optical path equal in its length to that provided by the similar CPR 215A of the example of FIG. 3A having a surface area a few times larger than that of the CPR 215A of the device 200B. In order to provide reflections, which are not total internal reflections (TIR), the CPR element can be designed with various angles in conjunction with appropriate coatings on those surfaces where no TIR occur.

FIG. 4 illustrates an all-optical switch device 300 designed so as to increase the optical path within the CPR elements, as compared to the examples of FIGS. 1A–1B and 2. This is achieved by using V-shaped corner prisms 315A and 315B made of a polarization rotating material. In is case, as clearly shown in the figure, a polarized beam entering the respective corner prism undergoes multiple reflections from the prism's surfaces, and returns into the polarizing beam splitter cube 12.

Figure 5:
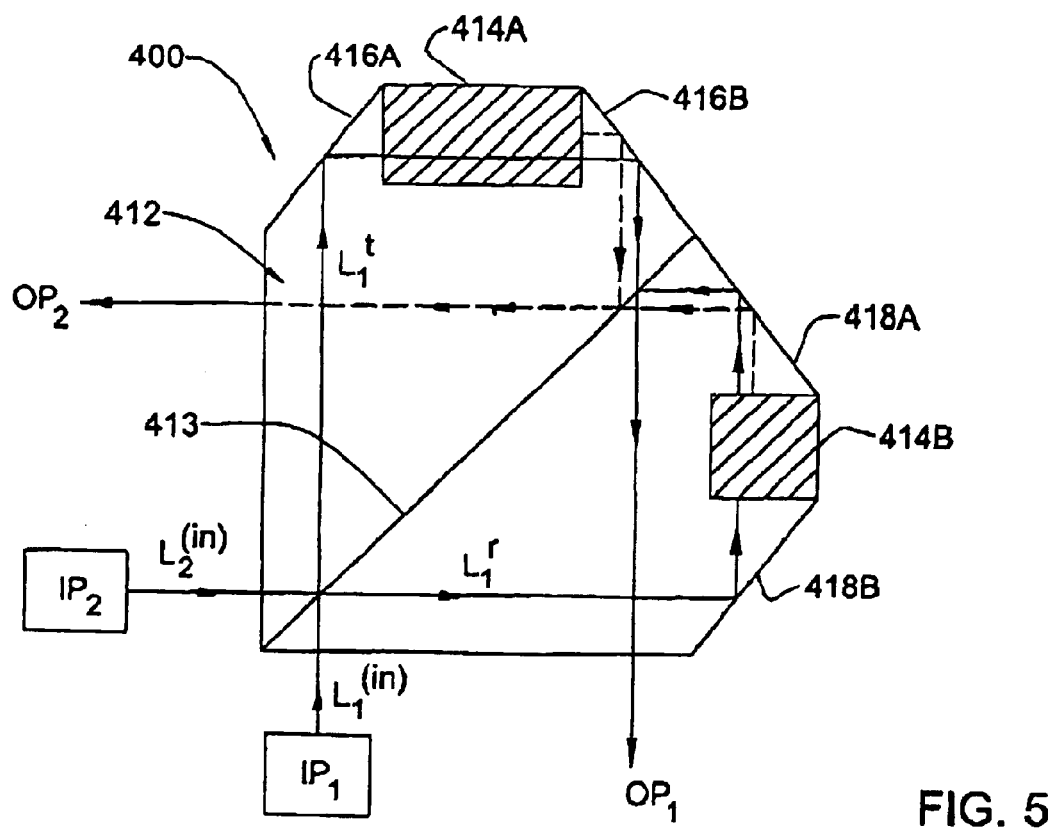

FIG. 5 illustrates an all-optical switch device 400, in which two surfaces of a polarizing beam splitter cube 412 are configured as two-part right-angle prisms 416A–416B and 418A–418B (similar to the prisms used in the example of FIGS. 1A–1B) and are reflective, thereby presenting the beam directing means. In this case, each of CPR elements 414A and 414B is located inside a groove-like space between the two pats of the respective prism. This construction is more compact has less protruding parts, and has less alignment procedure requirements during the manufacture of the device, as compared to the previously described examples.

Figure 6:
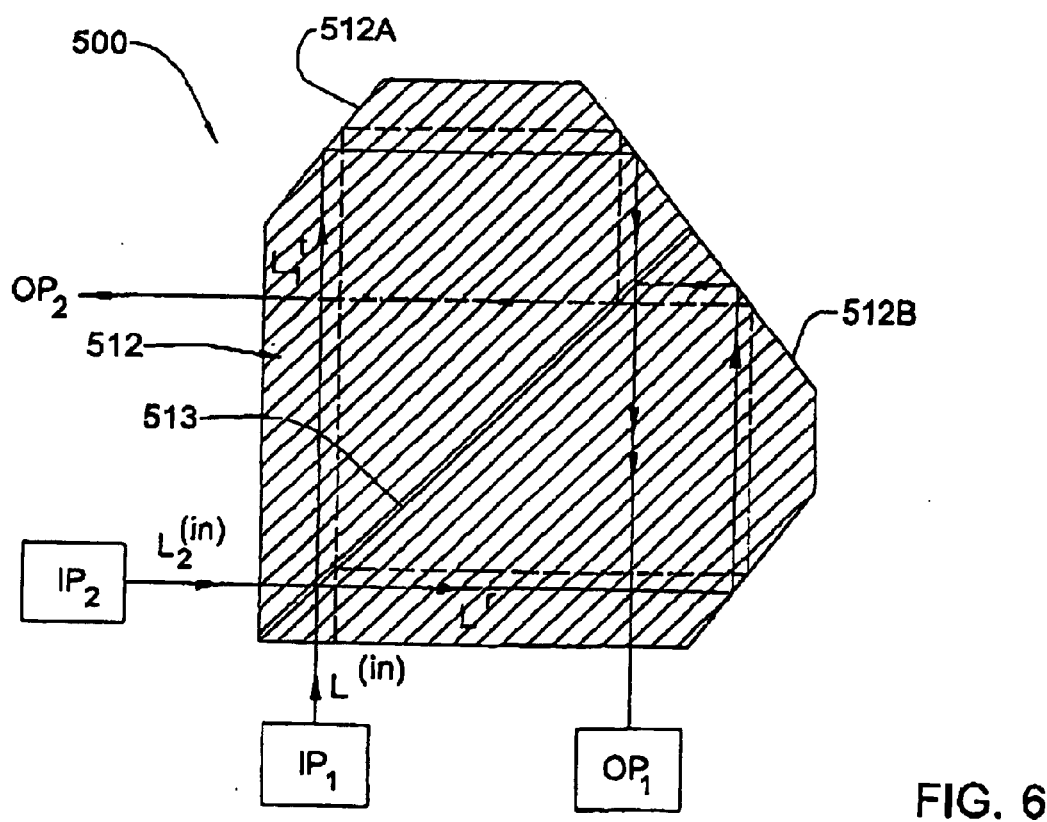

FIG. 6 illustrates an all-optical switch device 500, which is constructed generally similar to the device 400, but has a somewhat different design of its CPR and beam directing means. Here, two surfaces 512A and 512B of a polarizing beam splitter cube 512 are shaped like two prisms, respectively, and the entire beam splitter 512 is made from a polarization rotating material. In this case, a surface 513 of the beam splitter is formed with a polarizing coating (not shown), so as to enable to split an unpolarized input beam into two polarization components. It should be understood that the unpolarized beam, when entering the beam splitter in the active state of the CPR material, undergoes the polarization rotation of both polarization components in the beam prior to being split at the polarizing beam splitting surface 513, and the two polarization states of two beams having passed the diagonal surface are again affected by the beam splitter medium at the other side of the diagonal surface. When in the activated state of the beam splitter medium, each of the beam components (produced by the splitting of the input beam at the polarizing beam splitting surface 513 of the beam splitter) undergoes 90°-rotation until being combined again.

Figure 7:
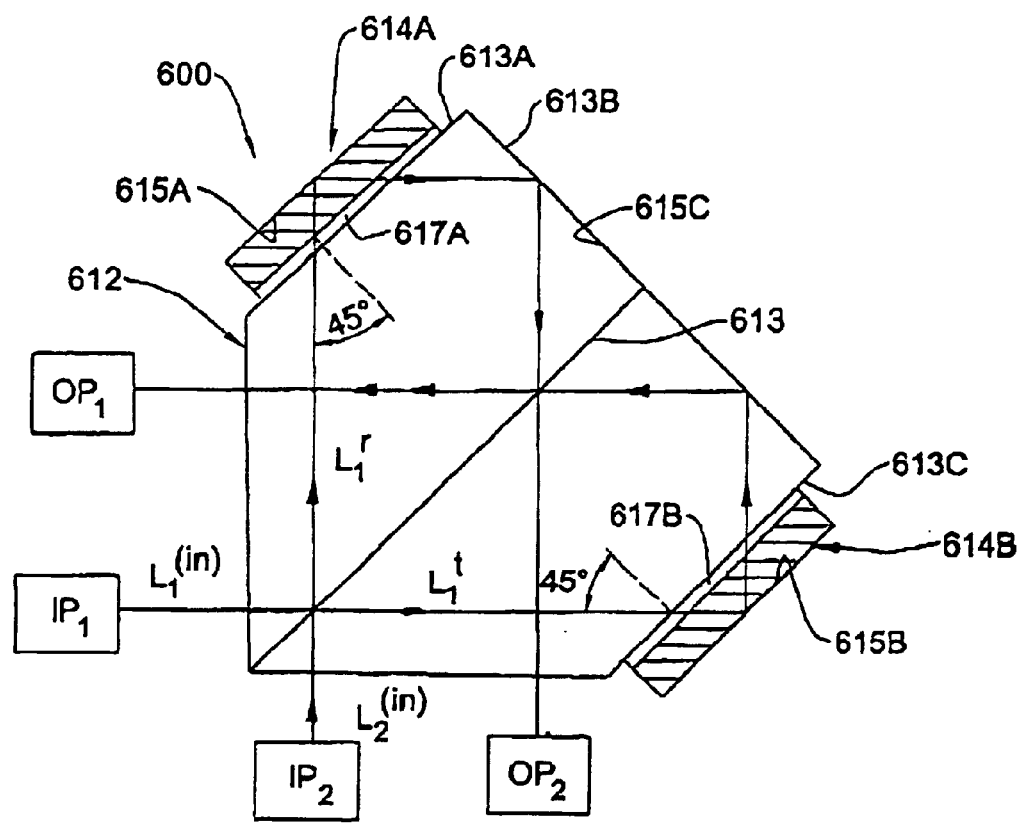

FIG. 7 illustrates an all-optical switch device 600, in which the beam directing means are partly incorporated in a polarizing beam splitter 612 (i.e., is presented by the reflective surfaces of the beam splitter) and partly incorporated in CPR elements 614A and 614B (i.e., is presented by reflective surfaces of the CPR elements). The beam splitter 612 has three truncated corners forming three locally adjacent facets 613A, 613B and 613C, wherein the intermediate facet 613B is that intercept with the plane of the polarizing diagonal surface 613. The CPR elements 614A and 614B are located on the facets 613A and 613C. The surfaces 615A and 615B of the CPR plates 614A and 614B, respectively, and the surface 615C of the facet 613B are reflective (as far as TIR cannot be achieved by the incidence angles), and serve as the beam directing means. The incidence angles of the beam components with respect to the CPRs 614A and 614B, respectively, are of 45 degrees. In order to effect a 90-degree polarization rotation by the CPR, $\lambda/2$-plates 617A and 617B are mounted, respectively, between the CPR 614A and the facet 613A, and between the CPR 614B and facet 613C. Alternatively, the front outer surfaces of the CPRs 614A and 614B may be formed with specific coatings to act as $\lambda/2$-plates. The $\lambda/2$-plates 617A and 617B are mounted at 22.5-degree orientation with respect to the CPRs, thus rotating the beam components by 45 degree, prior to the beams' interaction with the CPRs. In total, the angle between the incident beam component and the respective CPR axis will be of 45 degree.

Figure 8:
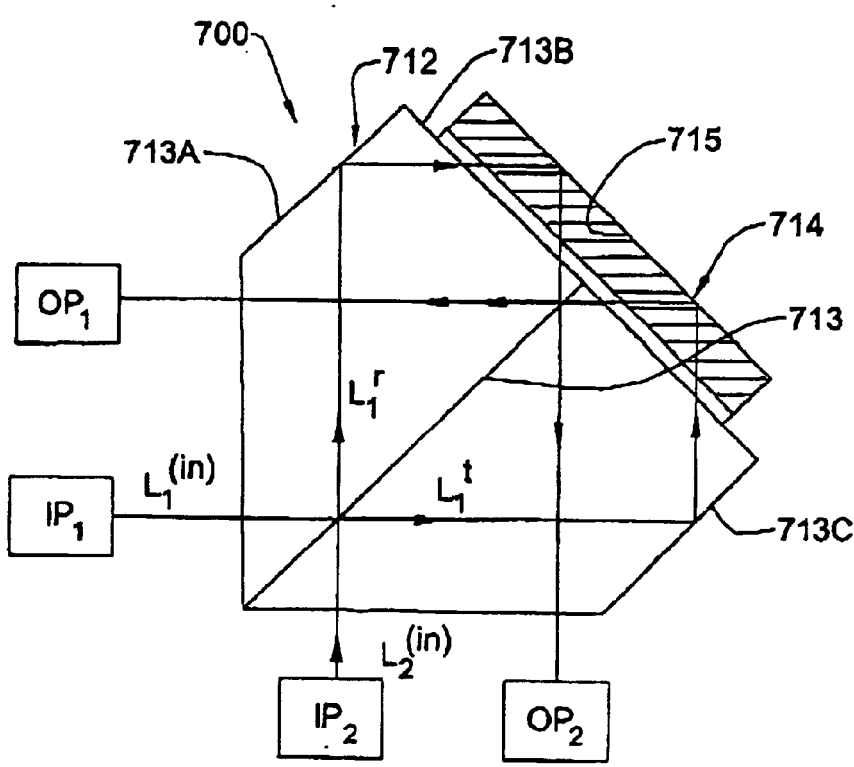

FIG. 8 illustrates an all-optical switch device 700 which has a beam splitter 712 constructed similarly to the beam splitter 612 of the previously described example, namely, having three facets 713A, 713B and 713C. In this case, however, only one CPR plate 714 is used being located an the facet 713B intercepting with the plane of the polarizing diagonal surface 713, and having a reflective surface 715.

It should be noted that, in each of the above-described switch devices, the input channels and the output channel can be relocated, replaced or interchanged, and the beam propagation paths within the devices will be reversed or changed accordingly.

Each of the above-described switch devices can be utilized as a basic block in a multi-stage switch structure, such as 1×n, 2×n, n×1, n×2, etc. The 1×n switching structure needs an array of (n−1) basic blocks (nodes) and (n−1) additional beam directing elements (e.g., appropriate mirrors with relay lenses, appropriate fiber optics with collimators) for directing the output beam of one block to input a successive block. The basic-block devices can be built as one block or may be separate blocks attached to each other. The spacing between each two locally adjacent blocks is defined by opto-mechanical or electronics requirements.

Figure 9:
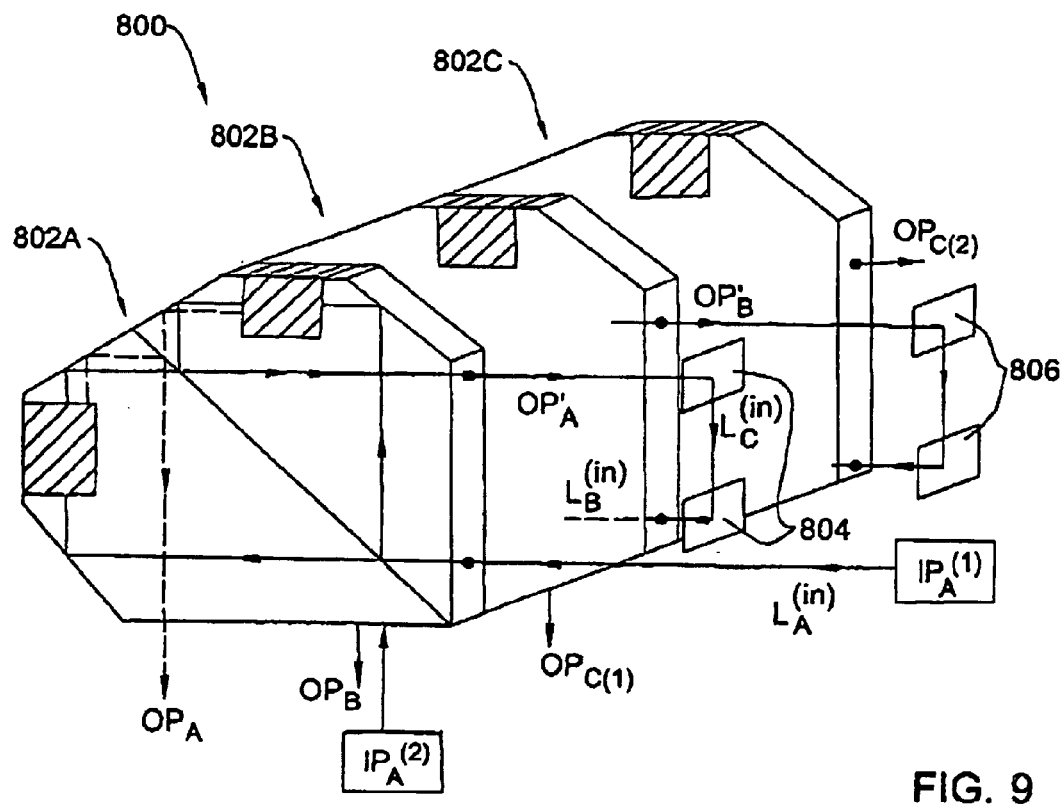
FIG. 9 illustrates a multi-stage all-optical switch device composed of an array of the basic block switching elements.

FIG. 9 exemplifies such a multi-stage all-optical switch structure 800 constructed to operate as a 1×4 switch. The structure 800 comprises an array of three switch devices 802A, 802B and 802C, each constructed as described above (either one of the previously described examples). An input beam (channel) may be supplied through either one of input ports $IP_A^{(1)}$ and $IP_A^{(2)}$ of the switch device 802A, and can be output at either one of output channels $OP_A$, $OP_B$, $OP_{C(1)}$, and $OP_{C(2)}$ associated with the switch devices 802A, 802B and 802C.

In the present example, the input light beam $L^{(in)}_A$ enters the switch element 802A through input port $IP_A^{(1)}$, and propagates within the element 802A as described above to be supplied to either the output channel $OP_A$ or output channel $OP_A'$. Here, the output channel $OP_A$ is one of the four outputs of the entire structure 800, and the output channel $OP_A'$ with a pair of beam directing elements 804 (e.g., mirrors combined with relay lenses or fiber optics combined with collimators, which are generally called "mirrors") installed therein serves as an input channel of the switching element 802B. These mirrors direct the output beam propagating through the channel $OP_A'$ to input the switching element 802B (input beam $L_B^{(in)}$).

Hence, if an output port $OP_B$ (i.e., the output of the switching element 802B) is considered as a currently operating output port of the structure 800, the beam propagation through the device 802A ensures the beam output at the channel $OP_A'$, and therefore the beam propagation within the switch device 802B. Similarly, the active output of the device 802B may be either one of the channels $OP_B$ or $OP_B'$. If the output channel $OP_C$ (i.e., the output of the switching element 802C) is considered as the operating output of the structure, the beam leaves the switching element 802B at the output channel $OP_B'$, and is directed to the switching element 802C as an input beam $L_C^{(in)}$ by mirrors 806.

Thus, one of the output channels of each switching device (except for the last switching device in the array) presents one of the n outputs of the structure 800, and the other output port serves for directing the beam to enter the successive switching device in the array. It should be understood that the same configuration can be alternatively used with the input beam $L_C^{(in)}$.

A 2×N all-optical switch can be implemented by a structure generally similarly to the above-described structure 800, but distinguishing therefrom in that both input ports of the first switching device in the array (802A in FIG. 9) are simultaneously used. In this case, either one of the two output channels is operated at a given time. Additionally, each of the two output ports $OP_A$ and $OP_A'$ of the structure 800 may be conveyed to, respectively, one of the input ports of the switch devices 802B and 802C.

It is important to note that in order to eliminate or least substantially reduce an unavoidably existing cross talk between the output ports of an all-optical switch (e.g., a basic block structure), such a basic block structure may be composed of two identical switching elements. The existence of the cross talk effect is associated with the following. Whenever one of the CPR elements (such as the PLZT) changes the polarization state of a beam, a certain error may occur. For example, if the CPR was set to rotate the polarization of a linearly polarized beam by 90°, it practically may rotate it by an angle slightly less than 90°, e.g., 88°-angle. Thus, assuming a 1×2 switch device with two active output ports, most of the beam energy is conveyed to the first selected output channel, the part (e.g., 2%) of the energy being, however, directed into the second output channel and presenting noise in this second active port.

Figure 10:
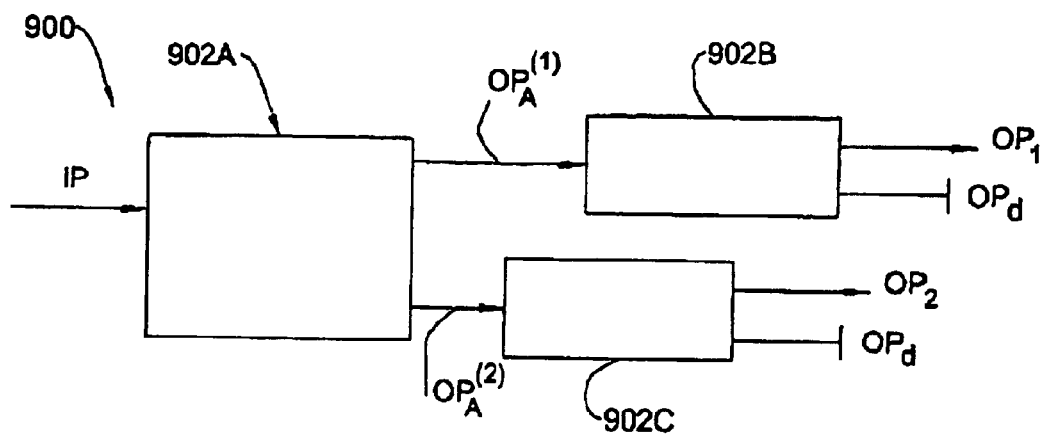
FIG. 10 illustrates an all-optical switch device according to the invention, aimed at reducing cross talk between outputs of the device, and also for increasing the switch speed.

A manner, in which such a 2%-error can be corrected will now be described with reference to FIG. 10, showing a block diagram of an all-optical switch structure 900 aimed at eliminating crosstalk between the output channels of a 1×2 switch device using a multistage switch such as 1×4 (e.g., the structure 800 of FIG. 9). The all-optical switch structure 900 is composed of three identical switch devices 902A, 902B and 902C. The switch devices are arranged such that two output channels $OP_A^{(1)}$ and $OP_A^{(2)}$ of the first device 902A serve as input channels of the devices 902B and 902C, respectively. As for the two output channels of each of the devices 902B and 902C, one of them is an active output $OP_1$ (and $OP_2$) of the device 900, and the other one $OP_d$ is the so-called "dead end", on which the cross talk is discharged.

An input channel IP supplies an input beam to the first switch device 902A, assuming that CPR element(s) thereof (not shown) is in its activated state. As a result of the aforesaid rotation error, each of output channels $OP_A^{(1)}$ and $OP_A^{(2)}$ contains a signal: one of them, e.g., $OP_A^{(1)}$, contains most of the energy, and the other output channel, $OP_A^{(2)}$, contains the noise-energy caused by the polarization rotation error. The signal from the output channel $OP_A^{(1)}$ is directed to the switch device 902B that produces the substantially similar rotation error. Most of the output energy of the device 902B is directed to an output channel $OP_1$ and the residual energy of the rotation error in switch device 902B is channeled to a dead end $OP_d$. The error output signal from the channel $OP_A^{(2)}$ is channeled to the switch device 902C. However, in order to prevent the error signal from reaching the active output channel $OP_2$ of the switch device 902C, the beam will be switched to a dead end $OP_d$. Assuming 88°-polarization rotation angle instead of 90°, the secondary residual energy arriving at the output channel $OP_2$ due to the error in switch device 902C is 0.1% ($OP.cos(88)^2$ of the input energy of the structure 900. In a similar way, in order to further decrease such crosstalk, additional switching stages can be added between the input port IP and the output ports.

The above-described technique can also be used for increasing the switching speed of the device. Since the operation of a CPR element (e.g., PLZT) is similar to a capacitor behavior, in order to rotate the polarization to a certain degree, a certain voltage should be applied across the PLZT device. The charge (discharge) rate of a capacitor is in general as follows:

$$\frac{V}{V_0} = 1 - \exp\left(-\frac{t}{RC}\right),$$

where $V_0$ and V are, respectively, the initial and end-point voltages. The PLZT speed is mainly restricted due to the systems constant RC. For example, to obtain $V/V_0=0.999$ and $V/V_0=0.92$, the parameters t=5RC and t=2.5RC, respectively, are needed. Thus, to charge the PLZT to 99.9% of its capacity, twice a time is needed than that needed to charge the PLZT to 92% of its capacity. By short the charging time in a similar way to the aforesaid examples, the polarization rotation angle of the PLZT will be less than 90°. Nonetheless, the resultant crosstalk will be treated using a multistage system such as that of FIG. 10 or a system similar to the system of FIG. 10, but with an increased number of switching stages and dead ends based on the cross talk requirements. Consequently a faster switching device can be achieved.

Those skilled in the art will readily appreciate that various modifications and changes may be applied to the embodiments of the invention as hereinbefore exemplified without departing from its scope defined in and by the appended claims. In the method claims which follow, characters which are used to designate claim steps, are provided for convenience only and do not apply any particular order of performing the steps.

What is claimed is:

1. A switching method for selectively directing an input beam to at least one of two output channels, the method comprising:

(i) providing incidence of the input beam onto a polarizing beam splitting surface to thereby enable splitting of the input beam into two beam components of different polarizations propagating along different optical paths;

(ii) passing the input beam components of different polarizations through a controllable polarization rotating medium operable to selectively affect the polarization of each of the beam components; and (iii) directing the beam components that have passed through the polarization rotating medium onto said polarizing beam splitting surface, thereby producing at least one output beam propagating towards at least one selected output channel, depending on a current mode of said medium;

wherein the input beam passes through the controllable polarization rotating medium prior to being split into said two beam components of different linear polarization states.

2. The method according to claim 1, wherein steps (i)–(iii) are repeated with respect to said at least one output beam by directing it towards an additional polarizing beam splitting surface, and passing split beam components of said at least one output beam through an additional controllable polarization rotating medium capable of affecting polarization of the split beam components, and an additional beam directing means that directs the beam components onto said additional polarizing beam splitting surface, thereby producing at least one additional output beam propagating towards a selected additional output channel.

3. A switching method for selectively directing an input beam to at least one of two output channels, the method comprising the steps of:

(i) providing incidence of the input beam onto a polarizing beam splitting surface to thereby enable splitting of the input beam into two beam components of different polarization propagating along different optical paths;

(ii) passing at least one of the input beam components through an optical filtering means accommodated in the optical path of said at least one input beam component, thereby enabling to filter light that has interacted with the polarizing beam splitting surface to correct for an error introduced by the polarizing beam splitting surface;

(iii) passing the input beam components of different polarizations through a controllable polarization rotating medium operable to selectively affect the polarization of each of the beam components; and (iv) directing the beam components that have passed through the polarization rotating medium onto said polarizing beam splitting surface, thereby producing at least one output beam propagating towards at least one selected output channel, depending on a current mode of said medium.

4. The method according to claim 3, wherein the spilt beam component passing through the filtering means is a beam component reflected from the polarizing beam splitting surface, said filtering means comprising an additional polarizing beam splitting surface, light reflected from said additional polarizing beam splitting surface propagating towards the controllable polarization rotating medium.

5. The method according to claim 3, wherein the split beam component passing through the filtering means is a beam component transmitted through said polarizing beam splitting surface, said filtering means comprising a polarization rotating element capable of 90°-rotating the polarization of the incident beam component, and a polarizing beam splitting surface, light passed through said polarization rotating element and reflected from said additional polarizing beam splitting surface propagating towards said controllable polarization rotating medium.

6. A switching method for selectively directing an input beam to at least one of two output channels, the method comprising the steps of:

(i) providing incidence of the input beam onto a polarizing beam splitting surface to thereby enable splitting of the input beam into two beam components of different polarizations propagating along different optical paths;

(ii) providing incidence of the input beam components onto a controllable polarization rotating medium operable to selectively affect the polarization of each of the beam components, with an incidence angle other than 90 degrees;

(iii) passing the input beam components through said medium; and (iv) directing the beam components that have passed through the polarization rotating medium onto said polarizing beam splitting surface, thereby producing at least one output beam propagating towards at least one selected output channel, depending on a current mode of said medium.

7. The method according to claim 6, steps (i)–(iii) are repeated with respect to said at least one output beam by directing it towards an additional polarizing beam splitting surface, and passing split beam components of said at least one output beam through an additional controllable polarization rotating medium capable of affecting polarizations of the split beam components, and an additional beam directing means that directs the beam components onto said additional polarizing beam splitting surface, thereby producing at least one additional output beam propagating towards a selected additional output channel.

8. A switching method for selectively directing an input beam to at least one of two output channels, the method comprising the steps of:

(i) providing incidence of the input beam onto a polarizing beam splitting surface to thereby enable splitting of the input beam into two beam components of different polarizations propagating along different optical paths;

(ii) passing the input beam components of different polarizations through a controllable polarization rotating medium operable to selectively affect the polarization of each of the beam components; and (iii) directing the beam components that have passed through the polarization rotating medium onto said polarizing beam splitting surface, thereby producing at least one output beam propagating towards at least one selected output channel, depending on a current mode of said medium;

wherein said medium is operated to provide a desired difference in phase delay in a range $0–\lambda/2$ between two principal axes of said medium, thereby enabling to obtain desirable partition between the two output channels.

9. The method according to claim 8, used for multicast switching.

10. The method according to claim 8, wherein one of the output channels is blocked, thereby enabling variable attenuating.

11. The method according to claim 1, where an electrostatic field applied to said medium is selected such as to compensate for a hysteresis phenomenon occurring in said medium.

12. The method according to claim 1, wherein an electrostatic field applied to said medium is selected so as to fit phases of the beam components passing therethrough, thereby compensating for a phase shift caused by beam reflection effects during the beam propagation.

13. The method according to claim 1, wherein an electrostatic field applied to said medium is such as to cause a difference of $\lambda/2$ in phase delay between the split beam components of different polarizations, the method thereby enabling to reduce switching differential voltage requirements.

14. An all-optical switch device for selectively directing an input beam to at least one of two output channels, the device comprising:

(a) a polarizing beam splitting surface capable of splitting an input beam into two beam components of different polarizations and directing the split beam components to propagate along different optical paths, and capable of combining two beam components of different polarizations to produce at least one output beam;

(b) a controllable polarization rotating medium accommodated in optical paths of the input beam components, and selectively operable to affect the polarization thereof, and (c) beam directing means accommodated in optical paths of the beam components passed through the polarization rotating medium for directing the beam components onto said polarizing beam splitting surface to thereby produce at least one output beam propagating towards at least one selected output channel;

wherein the controllable polarization rotating medium comprises two elements made of a polarization rotating material, and said beam directing means comprises two retro-reflective elements associated with said two polarization rotating elements, respectively, so as to reflect the beam components of different polarization of the input beam towards the polarization rotating elements, and reflect the beams passed through the polarization rotating elements onto said polarizing beam splitting surface.

15. The device according to claim 14, wherein said two polarization rotating elements and beam directing elements associated therewith are accommodated at opposite sides of said polarizing surface, respectively.

16. The device according to claim 15, wherein said polarizing beam splitting surface is a surface of a polarizing beam splitter made of a controllable polarization rotating material, said two polarization rotating elements being presented by two halves of the beam splitter at the opposite sides of the polarizing beam splitting surface.

17. The device according to claim 16, wherein said two beam directing elements are formed by reflective surfaces of the polarizing beam splitter.

18. The device according to claim 14, wherein each of the two beam directing elements is in the form of a two-part mirror, the corresponding one of the polarization rotating element being accommodated in a space between the two parts of the respective beam directing element.

19. The device according to claim 14, wherein said polarizing beam splitting surface is a surface of a polarizing beam splitter cube, which has two pairs of reflective surfaces shaped as two-part right-angle prisms defining two groove-like space; said two beam directing elements being presented by said reflective surfaces of the beam splitter, each of said two polarization rotating elements being accommodated inside the beam splitter within said groove-like spaces, respectively.

20. The device according to claim 14, wherein said medium exhibits an electro-optic effect.

21. The device according to claim 20, wherein said electro-optic effect is a linear effect.

22. The device according to claim 21, wherein said medium is made of ferroelectric crystals.

23. The device according to claim 14, wherein said medium is made of a liquid crystal (LC) material.

24. The device according to claim 14, operating as one of the following switches: 1×2, 2×1, 2×2.

25. A multi-stage all-optical switch structure comprising:
(i) an array of at least first and second switches, each switch according to claim 14; and
(ii) at least one beam-directing element accommodated in an optical path of the output beam produced by the first switch device to direct said output beam onto the polarizing beam splitting surface of the second switch device.

26. An all-optical switch device for selectively directing an input beam to at least one of two output channels, the device comprising:
(a) a polarizing beam splitting surface capable of splitting an input beam into two beam components of different polarizations and directing the split beam components to propagate along different optical paths, and capable of combining two beam components of different polarizations to produce at least one output beam;
(b) a controllable polarization rotating medium accommodated in optical paths of the input beam components, and selectively operable to affect the polarization thereof; and
(c) beam directing means accommodated in optical paths of the beam components passed through the polarization rotating medium for directing the beam components onto said polarizing beam splitting surface to thereby produce at least one output beam propagating towards at least one selected output channel;
wherein said medium is selected from the group consisting of lithium niobate (LiNbO$_3$) and materials exhibiting a quadratic electro-optic effect.

27. The device according to claim 26, where said medium is lithium niobate.

28. The device according to claim 26, where said medium exhibits a quadratic electro-optic effect.

29. The device according to claim 28, wherein said medium is made of ceramics.

30. The device according to claim 29, wherein said ceramics is Lead Lanthanum Zirconate Titanate (PLZT).

31. The device according to claim 26, wherein said polarizing beam splitting surface is a surface of a polarizing beam splitter cube, said beam directing means including reflective surfaces of the polarizing beam splitter.

32. The device according to claim 26, wherein said beam directing means are also accommodated in the optical paths of the split beam components of the input beam to direct said beam components to the polarization rotating means.

33. The device according to claim 26, and also comprising optical filtering means accommodated in the optical path of at least one of the beam components propagating toward the controllable polarization rotating medium, thereby enabling to filter light passed through the polarizing beam splitting surface to correct for an error introduced by the polarizing beam splitting surface.

34. The device according to claim 33, wherein the filtering means is accommodated in the optical path of the split beam component reflected from the polarizing beam splitting surface, said filtering means comprising an additional polarizing beam splitting surface, light reflected from said additional polarizing beam splitting surface reaching the controllable polarization rotating medium.

35. The device according to claim 33, wherein the filtering means is accommodated in the optical path of the split beam component transmitted through said polarizing beam splitting surface, said filtering means comprising a polarization rotating element capable of 90°-rotating the polarization of the incident beam component, and a polarizing beam splitting surface, light passed through said polarization rotating element and reflected from said additional polarizing beam splitting surface propagating towards said controllable polarization rotating medium.

36. The device according to claim 26, operating as one of the following switches: 1×2, 2×1, 2×2.

37. A multi-stage all-optical switch structure comprising at least two switch devices, each constructed according to claim 26, the structure thereby operating as one of the following switches: 1×2, 2×1, 2×2.

38. A multi-stage all-optical switch structure comprising:
(i) an array of at least first and second switches, each switch according to claim 26; and
(ii) at least one beam-directing element accommodated in an optical path of the output beam produced by the first switch device to direct said output beam onto the polarizing beam splitting surface of the second switch device.

39. The switching method for directing an input beam towards two output channels with a desired energy partition between the two output channels, the method utilizing light propagation through a switch device constructing according to claim 26, wherein said medium is operated to provide a desired difference in phase delay in a range 0–λ/2 between two principal axes of said medium.

40. A switching method for directing an input beam toward a selected one of two output channels with the other output channel being blocked, to thereby enable variable energy attenuating, the method utilizing light propagation through the switch device constructed according to claim 26, wherein said medium is operated to provide a desired difference in phase delay in a range 0–λ/2 between two principal axes of said medium.

41. A switching method for directing an input beam towards at least one output channel, the method utilizing light propagation through the switch device constructed according to claim 26, wherein operation of said controllable polarization rotating medium is appropriately controlled to compensate for a hysteresis phenomenon occurring is said medium.

42. A switching method for directing an input beam towards at least one output channel in a manner to reduce switching differential voltage requirements, the method utilizing the switch device constructed according to claim 26, wherein operation of said controllable polarization rotating medium is appropriately controlled such as to cause a difference of λ/2 in phase delay between the split beam components of different polarizations.

43. An all-optical switch device for selectively directing an input beam to at least one of two output channels, the device comprising:
(a) a polarizing beam splitting surface capable of splitting an input beam into two beam components of different polarizations and directing the split beam components to propagate along different optical paths, and capable of combining two beam components of different polarizations to produce at least one output beam;

(b) a controllable polarization rotating medium accommodated in optical paths of the input beam components, and selectively operable to affect the polarization thereof; and (c) beam directing means accommodated in optical paths of the beam components passed through the polarization rotating medium for directing the beam components onto said polarizing beam splitting surface to thereby produce at least one output beam propagating towards at least one selected output channel;

wherein the beam directing means is at least partly incorporated within the controllable polarization rotating medium.

44. The device according to claim 43, wherein the controllable polarization rotating medium comprises two elements made of a polarization rotating material, and said beam directing means comprises two retro-reflective elements associated with said two polarization rotating elements, respectively, so as to reflect the beam components of different polarizations of the input beam towards the polarization rotating elements, and reflect the beams passed through the polarization rotating elements onto said polarizing beam splitting surface.

45. The according to claim 44, wherein said two beam directing elements comprises surfaces of two polarization rotating elements, respectively.

46. The device according to claim 45, wherein the two polarization rotating elements are in the form of two corner prisms, respectively, having reflective inner surfaces, the corner prisms thereby serving as both the polarization rotating and the beam directing means.

47. The device according to claim 45, wherein the two polarization rotating elements are in the form of two penta-like prisms, respectively, having reflective inner surfaces, the corner prisms thereby serving as both the polarization rotating and the beam directing means.

48. The device according to claim 44, wherein said two beam directing elements are formed by inner surfaces of two substantially V-shaped structures, respectively, made of the polarization rotating material.

49. A multi-stage all-optical switch structure comprising:
(i) an array of at least first and second switches, each switch according to claim 43; and
(ii) at least one beam-directing element accommodated in an optical path of the output beam produced by the first switch device to direct said output beam onto the polarizing beam splitting surface of the second switch device.

50. The device according to claim 43, wherein said polarizing beam splitting surface is a surface of a polarizing beam splitter cube, which has three truncated corners forming three locally adjacent facets, such that the intermediate facet intercepts with a plane of said polarizing beam splitting surface, said polarization rotating means being in the form of two plates made of a polarization rotating material accommodated at the other two facets of the beam splitter, said beam directing means being formed by two reflective surfaces of said plates and a reflective surface of the intermediate facet, said reflective surfaces of the plates being rear surfaces with respect to the directions of beam propagation to the plates.

51. An all-optical switch device for selectively directing an input beam to at least one of two output channels, the device comprising:
(a) a polarizing beam splitting surface capable of splitting an input beam into two beam components of different polarizations and directing the split beam components to propagate along different optical paths, and capable of combining two beam components of different polarizations to produce at least one output beam;

(b) a controllable polarization rotating medium accommodated in optical paths of the input beam components, and selectively operable to affect the polarization thereof; and (c) beam directing means accommodated in optical paths of the beam components passed through the polarization rotating medium for directing the beam components onto said polarizing beam splitting surface to thereby produce at least one output beam propagating towards at least one selected output channel;

wherein said polarizing beam splitting surface is a surface of a polarizing cubic beam splitter, which has three truncated corners forming three locally adjacent facets, such that the intermediate facets intercepts with a plane of said polarizing beam splitting surface, said polarization rotating means being in the form of a plate accommodated at the intermediate facet outside of the beam splitter and having a reflective surface, said beam directing means being formed by said reflective surface of the plate and reflective surface of the other two facets.

52. A multi-stage all-optical switch structure comprising:
(i) an array of at least first and second switches, each switch according to claim 51; and
(ii) at least one beam-directing element accommodated in an optical path of the output beam produced by the first switch device to direct said output beam onto the polarizing beam splitting surface of the second switch device.

53. A switching method for reducing crosstalk between output channels of a switching structure where output light signals are collected, the method utilizing beam propagation through the switching structure composed of three switch devices, each device comprising:
(a) a polarizing beam splitting surface capable of splitting an input beam into two beam components of different polarizations and directing the split beam components to propagate along different optical paths, and capable of combining two beam components of different polarizations to produce at least one output beam;

(b) a controllable polarization rotating medium accommodated in optical paths of the input beam components, and selectively operable to affect the polarization thereof; and (a) beam directing means accommodated in optical paths of the beam components passed through the polarization rotating medium for directing the beam components onto said polarizing beam splitting surface to thereby produce at least one output beam propagating towards at least one selected output channel;

and having two output channels, wherein the two output channels of the first switch device are two input channels of, respectively, the second and third switch devices, one of the output channels of the second switch device and one of the output channels of the third switch device being blocked to prevent light output therethrough, light signals collected at unblocked output channels of the second and third switch devices being thereby characterized by reduced crosstalk.

54. A switching method according to claim 53, for increasing a switching speed, wherein the controllable polarization rotating medium of each of the three switch devices is operable to rotate the polarizations of the beam components passing therethrough at an angle other than 90 degree.

* * * * *